United States Patent [19]

Okumura

[11] Patent Number: 4,758,757
[45] Date of Patent: Jul. 19, 1988

[54] VIBRATION-DAMPING DEVICE FOR MINIATURE MOTOR BRUSHGEAR

[75] Inventor: Takeshi Okumura, Chiba, Japan

[73] Assignee: Mabuchi Motor Co., Ltd., Japan

[21] Appl. No.: 934,177

[22] Filed: Nov. 20, 1986

[30] Foreign Application Priority Data

Nov. 28, 1985 [JP] Japan ................... 60-267904

[51] Int. Cl.4 ................... H02K 13/10; H01R 39/18
[52] U.S. Cl. ................... 310/244; 310/51; 310/239
[58] Field of Search ................... 310/40 MM, 51, 239, 310/244, 246

[56] References Cited

U.S. PATENT DOCUMENTS 334,823  1/1886  Tesla ................... 310/244

FOREIGN PATENT DOCUMENTS 155923  9/1959  Japan .
108203  8/1979  Japan ................... 310/51
117455  9/1980  Japan .
59-50750  3/1984  Japan ................... 310/51

Primary Examiner—Patrick R. Salce
Assistant Examiner—D. L. Rebsch
Attorney, Agent, or Firm—McGlew and Tuttle

[57] ABSTRACT

A vibration-damping device for miniature motor brushgear comprising brush arms having sliding parts at the tips of a plurality of fork-like prongs, terminals and brush bases; the brush bases are supported by a motor case cover and the brush arm sliding parts make sliding contact with a motor commutator by the resiliency of the brush arm in which a soft photo-setting resin is applied on areas at the tips of the brush arms, other than the sliding parts, in such a manner that the fork-like prongs and/or gaps between the prongs are covered by the soft photo-setting resin. The fork-like prongs are individually and separately movable by controlling the flexibility of the soft photo-setting resin, by setting the coating weight or hardness after cure of the soft photo-setting resin to a predetermined value, or by applying soft photo-setting resin having different hardness values in multiple layers.

9 Claims, 2 Drawing Sheets

VIBRATION-DAMPING DEVICE FOR MINIATURE MOTOR BRUSHGEAR

BACKGROUND OF THE INVENTION

1. Field of the Invention

This invention relates generally to a vibration-damping device for miniature motor brushgear, and more particularly to a vibration-damping device for miniature motor brushgear in which the unwanted vibration of brushes caused by the rotation of the commutator is prevented by applying a soft photo-setting resin on the brush arms.

2. Description of the Prior Art

In recent years, an increasing number of miniature motors are being widely used as drive motors for audio equipment, industrial equipment and office equipment.

FIG. 3 (A) is a partially cut-away side elevation of such a miniature motor.

FIG. 3 (B) is a diagram of assistance in explaining the state where brushes are supported by a motor case cover.

In FIGS. 3 (A) and (B), reference numeral 1 refers to a brush arm; 2 to a brush base; 3 to a terminal; 4 to a motor case; 5 to a motor case cover; 6 to a bearing; 7 to a brush insertion hole; 8 to a rotor; 9 to a commutator; 10 to a magnet; 11 to a shaft; and 12 to a shaft hole, respectively.

As shown in FIG. 3 (A), the shaft 11 to which the rotor 8 and the commutator 9 are fixedly fitted is rotatably supported by the bearings 6 provided on the motor case 4 and motor case cover 5 in motor case 4 incorporating magnet 10. The brush arms 1 making contact with the commutator 9 are fixedly fitted to the motor case cover 5 as the brush bases 2 are inserted into the brush insertion holes 7 provided on the motor case cover 5, as shown in FIG. 3 (B).

The brush arm 1 fixedly fitted to the motor case cover 5 in the abovementioned state tends to cause unwanted chattering and to deteriorate commutating performance due to the vibration resulting from the irregular surface of the commutator 9 as the brush arm 1 slides on the commutator 9. Conventional means to prevent such an unwanted phenomenon include a brush vibration-damping device comprising a rubber sheet or film applied onto the brush arm 1 with a rubber or acrylic adhesive.

FIG. 4 (A) is a front view of a conventional brush vibration-damping device consisting of a rubber sheet applied onto the brush arm. FIG. 4 (B) is a side elevation of the same.

In the figures, numeral 13 refers to a rubber sheet; 14 to a fork-like prong of the brush arm 1.

When the vibration-damping rubber sheet 13 is applied on the brush arm 1 as a vibration damper, the rubber sheet 13 and the fork-like prongs 14 are formed into an integral part, and as a result the independent resiliency of each prong 14 is lost. This leads to deteriorated sliding contact between the fork-like brush arm 1 and the commutator 9 and the loss of the spark-quenching effect brought about by the multi-point contact with the commutator of the brush arm fork-like prongs. Furthermore, this arrangement involves an additional operation of applying a cut length of the rubber sheet 13 on the brush arm 1.

RELATED PATENT APPLICATION INFORMATION

FIG. 5 (A) is a front view of a vibration-damping device according to copending U.S. application Ser. No. 57,952 which subject matter is continued from U.S. application Ser. No. 755,069 filed July 15, 1985, now abandoned, conceived as a predecessor of the present invention in which a soft photo-setting resin is applied on brush arms. FIG. 5 (B) is a side elevation of the same.

In the figures, numeral 15 refers to a soft photo-setting resin, and other numerals correspond with like parts shown in FIG. 4.

The example shown in FIG. 5 was proposed by the present applicant in Japanese Patent Application No. 155923/1984. In this example, the soft photo-setting resin 15 is applied over one side of the fork-like prongs of the brush arm 1, excluding the area which makes contact with the commutator. In this case, the independence of the fork-like prongs 14 of the brush arm 1 is increased, but each of the fork-like prongs 14 has to be coated one by one with the soft photo-setting resin. This coating operation involves a considerable degree of precision, posing a problem in working efficiency.

SUMMARY OF THE INVENTION

This invention is intended to overcome the aforementioned problems.

It is a first object of this invention to provide a vibration-damping device for miniature motor brushgear which can absorb the unwanted vibration generated by brushes without sacrificing the functions of fork-like brush arms by applying a soft photo-setting resin over the entire surface of the brush arm.

It is a second object of this invention to provide a vibration-damping device for miniature motor brushgear in which the soft photo-setting resin forms a coated surface, including not only the brush arms but also part of the brush bases.

It is a third object of this invention to provide a vibration-damping device for miniature motor brushgear in which a soft photo-setting resin surface is formed by applying and filling the soft photo-setting resin up to a motor case cover and an area near terminal holes provided on the motor case cover.

It is a fourth object of this invention to provide a vibration-damping device for miniature motor brushgear in which the motor case cover and the soft photo-setting resin coated surface are bridged by another soft photo-setting resin at the mid-point of the brush arms.

It is a fifth object of this invention to provide a vibration-damping device for miniature motor brushgear in which the independence of individual fork-like prongs of the brush arms is maintained while ensuring the vibration-damping effect by setting the coating weight or hardness after cure of the soft photo-setting resin to a predetermined value.

It is a sixth object of this invention to provide a vibration-damping device for miniature motor brushgear in which the independence of individual fork-like prongs of the brush arms is maintained while ensuring the vibration-damping effect by applying soft photo-setting resin having different hardness values in multiple layers.

These and other objects and advantages of this invention will become more apparent upon a reading of the following detailed description and appended drawings.

DETAILED DESCRIPTION OF THE EMBODIMENTS

Figure 1A:
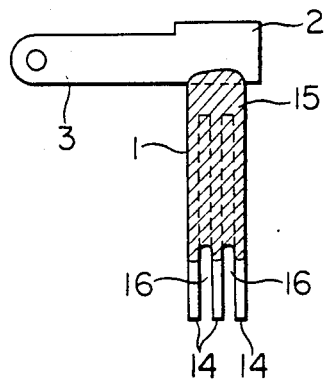
FIGS. 1 (A) and (B) are front and side views, respectively, of a brush arm of a basic embodiment of this invention.
Figure 1B:
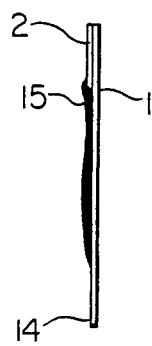

In FIG. 1, numeral 1 refers to a brush arm; 2 to a brush base; 3 to a terminal; 14 to a fork-like prongs; 15 to a soft photo-setting resin (or the coated surface thereof); and 16 to a gap, respectively.

The basic embodiment of this invention is a vibration-damping device formed by applying a soft photo-setting resin over the entire one side surface of the forked portion of the brush arm 1, except an area which is in contact with the commutator, as shown in FIGS. 1 (A) and (B). In other words, the soft photo-setting resin coated surface 15 is formed by applying the soft photo-setting resin on the fork-like prongs 14 of the brush arm 1, including gaps between the prongs. This arrangement therefore makes it possible to substantially improve working efficiency, compared with the conventional arrangement in which the resin is applied on the fork-like prongs 14 only. Furthermore, the flexibility of the soft photo-setting resin being applied permits each of the fork-like prongs 14 of the brush arm 1 to move independently from each other, thus preserving the advantages of the fork-shaped brushes. In addition, the independence of the fork-like prongs 14 can be maintained while ensuring the vibration-damping effect by setting the coating weight or hardness after cure of the soft photo-setting resin to a predetermined value, or by applying the soft photo-setting resin having different hardness values in multiple layers.

Figure 2A:
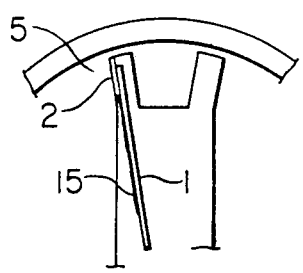
FIGS. 2 (A), (B) and (C) are enlarged views of the essential parts of another embodiment of this invention.
Figure 2B:
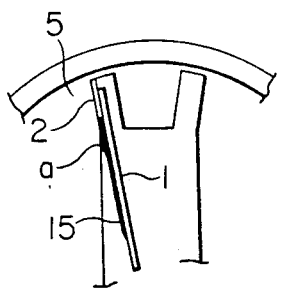
Figure 2C:
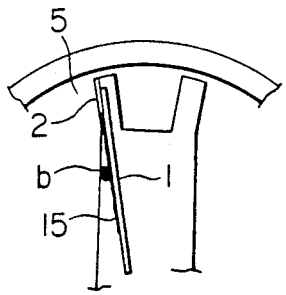
Figure 3A:
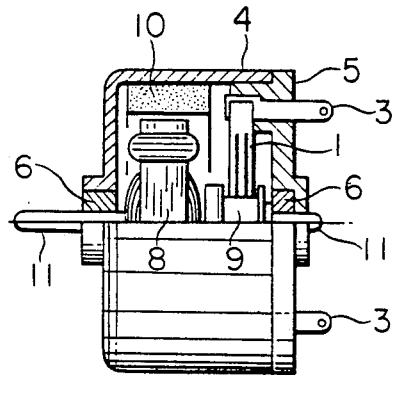
FIGS. 3 (A), (B) show longitudinal and cross sectional views of the brush arms mounted in a motor.
Figure 3B:
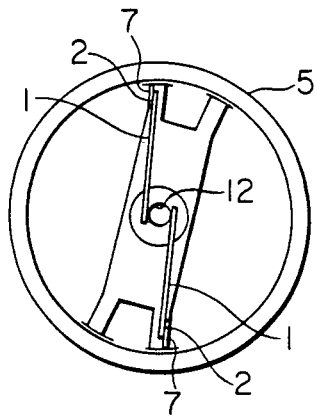
Figures 4A, 4B:
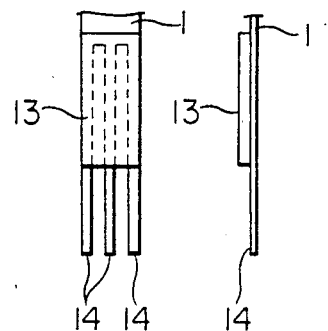
FIGS. 4 (A), (B) show views of the prior art device.
Figures 5A, 5B:
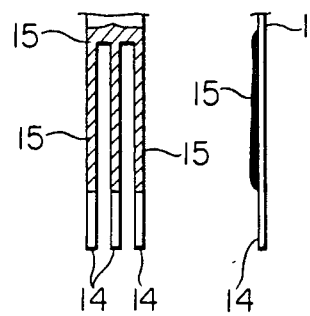
FIGS. 5 (A), (B) show views of the inventive device.

FIGS. 2 (A), (B) and (C) are enlarged views of the essential parts of another embodiment of this invention.

In the figures, 5 refers to a motor case cover, and other numerals correspond with like parts shown in FIG. 1.

The embodiment shown in FIG. 2 (A) is essentially identical to the basic embodiment described, referring to FIG. 1, except that the soft photo-setting resin coated surface 15 is formed on the brush arm 1 only. (In the basic embodiment, the soft photo-setting resin surface 15 is formed not only on the brush arm 1 but also on part of the brush base 2.)

The embodiment shown in FIG. 2 (B) is an arrangement where the soft photo-setting resin is applied and filled up to the motor case cover 5 and an area (shown by a) near the terminal insertion hole provided on the motor case cover 5.

The embodiment shown in FIG. 2 (C) is an arrangement where the motor case cover 5 and the soft photo-setting resin surface 15 are bridged by another soft photo-setting resin at the mid-point (shown by b) of the brush arm 1.

In the aforementioned embodiments of this invention, it is needless to say that the independence of the fork-like prongs can be maintained while ensuring the vibration-damping effect by setting the coating weight or hardness after cure to a predetermined value, or by applying the soft photo-setting resin having different hardness values in multiple layers.

As described above, this invention makes it possible to damp the unwanted vibration generated by the brushes of a miniature motor to ensure a smooth sliding contact between the brush and the commutator, thereby stabilizing commutating properties, extending motor life, improving working efficiency, and enabling volume production.

What is claimed is:

1. A vibration-damping device for miniature motor brushgear comprising brush arms having sliding parts at the tips of fork-like prongs, terminals and brush bases; said brush bases being supported by a motor case cover and said sliding parts being adapted to make sliding contact with a motor commutator, and characterized in that a soft photo-setting resin is applied on said brush arms, except areas at which said brush arms make contact with said commutator, in such a manner that said soft photo-setting resin covers not only said fork-like prongs but gaps between said fork-like prongs, and each of said fork-like prongs being independently movable by resiliency of said soft photo-setting resin.

2. A vibration-damping device for miniature motor brushgear as claimed in claim 1 wherein said soft photo-setting resin forms a coated surface, including not only said brush arms but also part of said brush bases.

3. A vibration-damping device for miniature motor brushgear as claimed in claim 1 wherein said soft photo-setting resin is applied up to said motor case cover and an area close to terminal insertion holes provided on said motor case cover to form a soft photo-setting resin coated surface.

4. A vibration-damping device for miniature motor brushgear as claimed in claim 1 wherein said motor case cover and said soft photo-setting resin coated surface are bridged by a soft photo-setting resin at the mid-point of ssid brush arms.

5. A vibration-damping device for miniature motor brushgear as claimed in claim 1 wherein the coating weight of said soft photo-setting resin is set to a predetermined value to maintain the independence of each of said fork-like prongs while ensuring the vibration-damping effect thereof.

6. A vibration-damping device for miniature motor brushgear as claimed in claim 1 wherein the hardness after cure of said soft photo-setting resin is set to a predetermined value to maintain the independence of each of said fork-like prongs while ensuring the vibration-damping effect thereof.

7. A vibration-damping device for miniature motor brushgear as claimed in claim 1 wherein said soft photo-setting resin having different hardness values is applied in multiple layers to maintain the independence of each of said fork-like prongs while ensuring the vibration-damping effect thereof.

8. A vibration-damping device for a miniature motor brushgear comprising: at least one brush arm having fork-like prongs with tips having sliding parts, a brush arm terminal and a brush base; a motor case cover supporting said brush base to allow said sliding part to make sliding contact with a motor commutator; a soft photo-setting resin applied on said brush arms from said brush base up to said sliding part, said soft photo-setting resin covering a portion of said fork-like prongs and also covering a portion bridging said fork-like prongs, each of said fork-like prongs being independently movable because of the resiliency of said soft photo-setting resin.

9. A vibration-damping device for a miniature motor brush according to claim 8, wherein: said soft photo-setting resin is applied in multiple layers each layer having different hardness values so as to maintain the independence of each of said fork-like prongs while insuring the vibration-damping effect thereof.

* * * * *